United States Patent Office 3,470,223
Patented Sept. 30, 1969

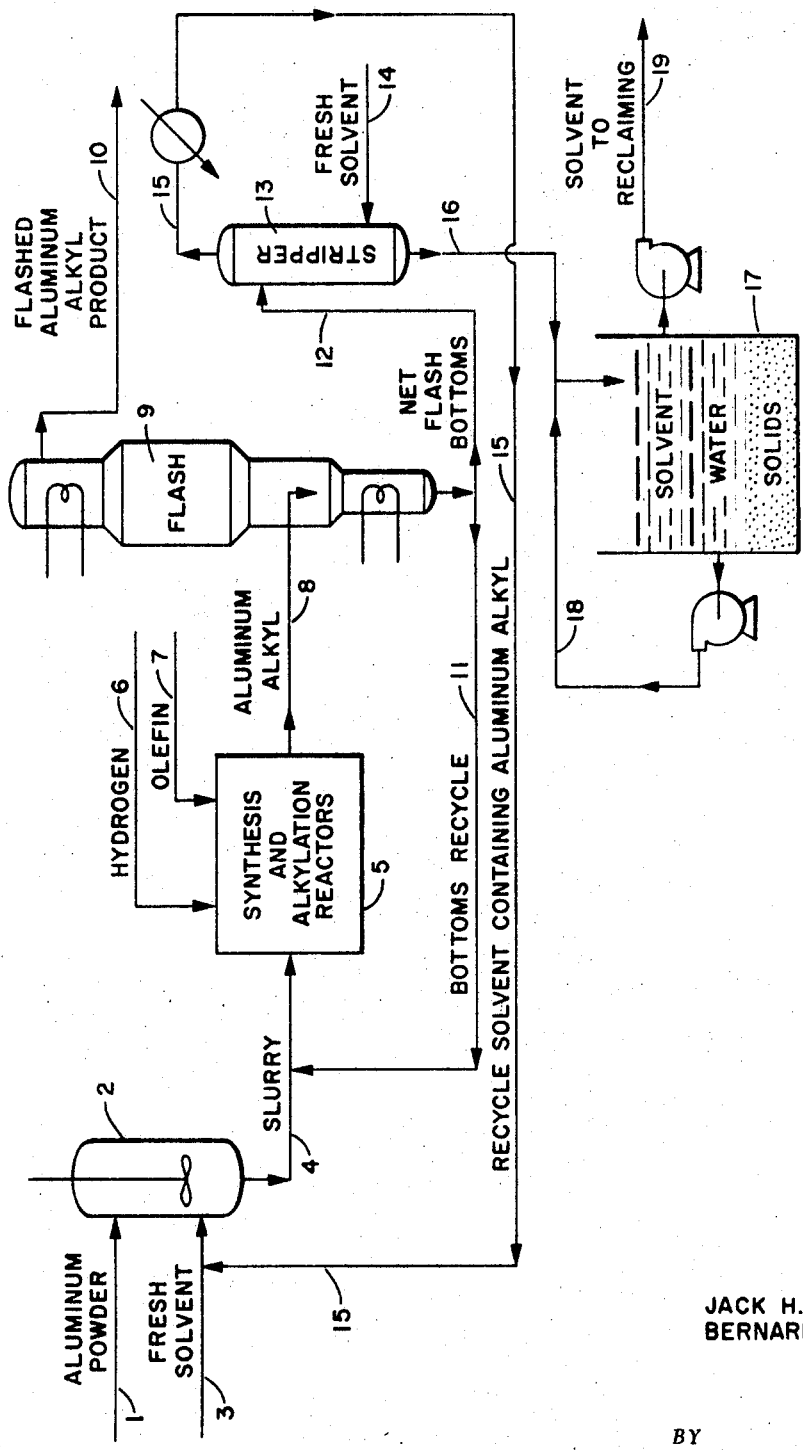
JACK H. SMITH
BERNARD J. LAURENT
*INVENTORS.*

3,470,223
SOLIDS PURGING FROM AN ALUMINUM
ALKYL STREAM
John H. Smith and Bernard J. Laurent, Ponca City,
Okla., assignors to Continental Oil Company, Ponca
City, Okla., a corporation of Delaware
Filed Feb. 2, 1967, Ser. No. 613,677
Int. Cl. C07f 5/06; B01d 11/00
U.S. Cl. 260—448                    6 Claims

ABSTRACT OF THE DISCLOSURE

A solution of aluminum alkyl in solvent is flashed to recover aluminum alkyl overhead; a portion of the solvent bottoms contaminated with solid impurities is stripped with additional solvent to remove residual alkyl aluminum, and the stripper bottoms are drowned in water.

Brief summary of the invention

Low molecular weight aluminum alkyls, such as aluminum triethyl, aluminum diethyl hydride, aluminum tripropyl, etc., are synthesized by first reacting an initial portion of an aluminum trialkyl with metallic aluminum and hydrogen to form an aluminum dialkyl hydride, which is then alkylated with an olefin to produce more aluminum trialkyl than was charged. A portion of this latter material can be recycled to maintain the process, and another portion is net product. The two preceding steps are normally effected in a diluent or solvent. The net product stream is contaminated with finely divided solid impurities, such as entrained aluminum, various other metals and metal oxides contained in the charged aluminum. These impurities must be maintained at a low value in the net product aluminum trialkyl stream in order for it to be acceptable for various commercial uses, such as in the Ziegler growth reaction. These fines have previously been removed, in commercial plants, by operations such as centrifugation, filtration, and simple flash distillation, but the two former operations require substantial maintenance, and all operations thus far proposed result in considerable losses of aluminum alkyl and solvent, in addition to being hazardous because of the pyrophoric nature of aluminum alkyls. It has also been proposed to remove these solids by burning a slip stream from a flash distillation, but such an operation is both dangerous and costly from teh viewpoint of product loss.

We have now discovered that inert solids can be maintained at a low value in the system by continuously flashing the solution of aluminum alkyl at such conditions as to make the bulk of the aluminum alkyl product and solvent overhead, leaving as bottoms only a minor amount of solvent, containing aluminum alkyl and essentially all the solid impurities. A portion of these bottoms can be recycled to the aluminum alkyl synthesis reaction in order to minimize the amount which must be purified, but the recycled proportion must be maintained at a sufficiently low level that the solid impurities stay below the desired level in the synthesis reaction. The remainder of the flashed bottoms stream is passed to a stripping operation wherein it is countercurrently contracted with fresh solvent vapors so as to recover overhead a stream of solvent containing aluminum alkyl, which can be recycled to the synthesis reaction. The stripper bottoms, comprising solvent containing essentially all the solid impurities, is then passed to a holding zone, such as an open-topped vessel, containing water. This material then separates into three layers; an upper layer of solvent which can be reclaimed, an intermediate layer of water, and a lower layer of solids sludge. This latter layer is periodically dredged from the vessel.

Brief description of the drawing

Further understanding of the invention can be gained by reference to the drawing, in which the sole figure is a schematic flow diagram of a preferred embodiment of the present invention.

Detailed description

According to the present process, aluminum, preferably in finely divided or powder form, is passed by conduit 1 to a mixing vessel 2, where it is mixed with solvent introduced by way of conduit 3 to form a reactant slurry. This slurry is passed by way of conduit 4 to a reaction section 5. Assuming the desired aluminum alkyl product to be aluminum triethyl, the following reactions are effected in section 5:

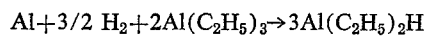

and

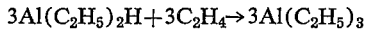

Hydrogen and the alkylating olefin, in this instance ethylene, are introduced by way of conduits 6 and 7, respectively. Further details of these reactions can be obtained, for example, from U.S. Patent 3,104,252 to Radd et al., issued Sept. 17, 1963. Then, according to the present invention, the aluminum alkyl produced is passed by way of conduit 8 to flash tower 9, where a clean net product of aluminum alkyl in solvent is removed by way of conduit 10. A portion of the flash tower bottoms, comprising solvent, aluminum alkyl, and essentially all of the finely divided solid impurities which are carried in with the feedstreams and which also originate from the equipment itself, can be recycled to the process by way of conduit 11 to allow some build-up of solids in the system and concurrently reduce the load on the purification system, if desired. Sufficient flash tower bottoms to maintain the impurities in the system at a desired level are removed from the reaction system by way of conduit 12 and passed to stripper 13. Here the material is stripped by fresh solvent vapors introduced by way of conduit 14, which recovers from the solids the most of the aluminum alkyl. The solvent containing aluminum alkyl is recovered overhead from the stripper by way of conduit 15, and can be recycled to a suitable point in the process, such as for example into fresh solvent stream 3. The bottoms from the stripper, comprising finely divided solid impurities in solvent, are removed from the stripper by way of conduit 16 and passed to a phase separation vessel 7. Water by way of conduit 18 is preferably mixed into this stream prior to its being passed to the vessel 17. This water results in killing any remaining aluminum alkyl. The water can, of course, be recovered from the phase separation and recycled into conduit 16. Solvent is also recovered from the phase separation by way of conduit 19, and can be purified by, e.g. distillation for recycle. We presently prefer that the inert solids in the system be maintained below a maximum of about 5 weight percent, i.e. in stream 8. It will be recognized that this can be varied, for example, by varying the split between conduits 11 and 12.

Although the preceding explanation has been directed to producing aluminum triethyl, it will be readily recognized that the system is adaptable to producing any aluminum alkyl, depending upon the olefin introduced via conduit 7. Exemplary but not limiting of other olefins which can be used in this method are aluminum tri-n-propyl, aluminum tri-i-propyl, aluminum tri-i-butyl, and the aluminum tri-n-octyl. The solvent to be used in the system must of course be inert to the various reactants, and should preferably boil at a slightly higher temperature than the aluminum alkyl product for ease of subsequent separation. Suitable solvents include paraffins and aromatics, such as decane, xylenes, kerosene, etc. Conditions of pressure and temperature in the flash zone 9 and the stripper zone 13 depend upon the particular aluminum alkyl and solvent involved, as will be readily recognized. When the aluminum alkyl product is aluminum triethyl and the solvent is a mixture of normal paraffins boiling in the $C_{12}$–$C_{14}$ range, the pressure in the upper section of the flash tower 9 can advantageously be about 30 mm. Hg abs. This results in pressures of about 35 mm. Hg abs. and 50 mm. Hg abs. in the upper and lower sections of the stripping zone 13, respectively. The corresponding temperatures are about 252° F. and 258° F. in the upper and lower sections of the flash tower 9, respectively, and about 268° F. and 287° F. in the upper and lower sections of the stripping zone 13, respectively.

Example

The following example illustrates operation of a prefered embodiment of the invention according to the figure. The make-up of aluminum slurry in vessel 2 and the reactions in zone 5 are not included, since they are part of the prior art.

UNIT OF WEIGHT/UNIT OF TIME

| Stream No. | Aluminum triethyl | Solvent | Aluminum metal | Inert solids |
|---|---|---|---|---|
| 8 | 7,079 | 12,356 | 818 | 205 |
| 10 | 5,115 | 5,114 | 0 | 0 |
| 11 | 1,868 | 6,888 | 778 | 195 |
| 12 | 96 | 354 | 40 | 10 |
| 14 | 0 | 1,500 | 0 | 0 |
| 15 | 85 | 1,421 | 0 | 0 |
| 16 | 11 | 433 | 40 | 10 |
| 19 | 0 | 433 | 0 | 0 |

The solvent in the preceding example comprises a mixture of normal paraffins, primarily equal parts by weight of n-dodecane and n-tetradecane with minor amounts of lower and higher boiling material. All flows in the above table are in lbs. per hr. Overhead pressure of flash zone 9 is about 30 mm. Hg, with the resultant overhead temperatures being about 252° F. Overhead pressure of stripping zone 9 is about 35 mm. Hg with resultant overhead temperature of about 268° F.

Having thus described the invention by providing specific examples thereof, it is to be understood that no undue limitations or restrictions are to be drawn by reason thereof and that many variations and modifications are within the scope of the invention.

What is claimed is:

1. In the method of producing an aluminum alkyl wherein aluminum alkyl, aluminum, hydrogen and an olefin are reacted in a diluent to produce additional aluminum alkyl, the improvement in removing solid contaminants from said stream comprising additional aluminum alkyl which comprises flashing said stream at sub-atmospheric pressure, recovering overhead from said flashing a product comprising aluminum alkyl and diluent, recovering as bottoms from said flashing a slurry comprising diluent, aluminum alkyl and solid contaminants, passing at least a portion of said slurry to a stripping zone, contacting said slurry in said stripping zone at subatmospheric pressure with clean diluent vapor, recovering overhead from said stripping zone a stream comprising diluent and minor amounts of aluminum alkyl, recovering as bottoms from said stripping zone a stream comprising solid contaminants and diluent, and contacting the last-mentioned stream with water.

2. The method of claim 1 wherein said aluminum alkyl comprises aluminum triethyl, and said olefin comprises ethylene.

3. The method of claim 1 wherein another portion of said slurry is recycled to the step of reacting aluminum alkyl, aluminum, hydrogen and an olefin in a diluent.

4. The method of claim 3 wherein the stream overhead from said stripping zone is recycled to said step of reacting.

5. The method of claim 4 wherein the stream resulting from said step of contacting with water is phase separated, the resulting aqueous phase is returned to said step of contacting with water, and the resulting diluent phase is recovered.

6. The process for producing aluminum triethyl which comprises:
   (a) passing a slurry comprising finely divided metallic aluminum in diluent to a first reaction zone,
   (b) reacting said slurry in said first zone with hydrogen and triethylaluminum to produce diethylaluminum hydride in diluent,
   (c) passing said diethylaluminum hydride in diluent to a second reaction zone,
   (d) reacting said diethylaluminum hydride in said second zone with ethylene to produce a stream comprising aluminum triethyl, diluent, and finely divided solids,
   (e) passing the stream resulting from step (d) to a flash zone under conditions of elevated temperature and sub-atmospheric pressure,
   (f) recovering from an upper portion of said flash zone a product stream comprising aluminum triethyl and diluent,
   (g) recovering from a lower portion of said flash zone a stream comprising diluent and minor amounts of aluminum triethyl and finely divided solids,
   (h) passing a first portion of the stream of step (g) to the slurry of step (a),
   (i) passing a second portion of the stream of step (g) to a stripping zone under conditions of elevated temperature and sub-atmospheric pressure,
   (j) contacting said second portion in said stripping zone with diluent,
   (k) removing from an upper portion of said stripping zone a stream comprising diluent with minor amounts of aluminum triethyl,
   (l) returning the stream of step (k) to a point in the process upstream of the reaction step (b),
   (m) removing from a lower portion of said stripping zone a stream comprising finely divided solids in diluent,
   (n) contacting the stream of step (m) with water,
   (o) phase-separating the stream resulting from step (n) to form an upper diluent phase, an intermediate aqueous phase, and a lower solid phase, and
   (p) returning said intermediate aqueous phase to the contacting of step $n$.

References Cited

UNITED STATES PATENTS

| 2,341,433 | 2/1944 | Fisher | 203—44 |
| 2,388,040 | 10/1945 | Clark | 203—44 |
| 2,433,286 | 12/1947 | McKinnis | 203—69 |
| 2,952,698 | 9/1960 | Neal et al. | |
| 2,958,703 | 11/1960 | Nowlin et al. | |
| 3,104,251 | 9/1963 | Foster et al. | 260—448 |
| 3,104,252 | 9/1963 | Radd et al. | |
| 3,207,770 | 9/1965 | Ziegler et al. | |
| 3,218,343 | 11/1965 | Acciarri et al. | |
| 3,311,545 | 3/1967 | Rasmussen | 203—69 |
| 3,373,179 | 3/1968 | Lewis. | |

TOBIAS E. LEVOW, Primary Examiner

H. M. S. SNEED, Assistant Examiner

U.S. Cl. X.R.

203—43, 44, 69, 77, 88; 210—73